United States Patent [19]

Stanley

[11] Patent Number: 4,640,041

[45] Date of Patent: Feb. 3, 1987

[54] SPINNER BAIT WITH ARMS OF DIFFERENT DIAMETER

[75] Inventor: Lonnie D. Stanley, Huntington, Tex.

[73] Assignee: Stanley Jigs, Inc., Huntington, Tex.

[21] Appl. No.: 744,144

[22] Filed: Jun. 12, 1985

[51] Int. Cl.$^4$ ............................................. A01K 85/00
[52] U.S. Cl. ................................. 43/42.13; 43/42.14; 43/42.19; 43/42.25; 43/42.32
[58] Field of Search .................. 43/42.11, 42.13, 42.14, 43/42.16, 42.18, 42.19, 42.25, 42.32

[56] References Cited

U.S. PATENT DOCUMENTS

| | | | |
|---|---|---|---|
| 1,295,617 | 2/1919 | Shannon | 43/42.13 |
| 2,281,578 | 5/1942 | Heddon | 43/42.13 |
| 2,426,571 | 8/1947 | Wynn | 43/42.25 |
| 3,257,750 | 6/1966 | Shannon | 43/42.13 |
| 3,504,454 | 4/1970 | Turbeville | 43/42.11 |
| 4,011,681 | 3/1977 | Johnson | 43/42.11 |
| 4,209,932 | 7/1980 | Pate | 43/42.11 |
| 4,571,877 | 2/1986 | Montgomery | 43/42.11 |

Primary Examiner—Nicholas P. Godici
Assistant Examiner—Christopher L. McKee
Attorney, Agent, or Firm—Harold H. Dutton, Jr.

[57] ABSTRACT

An artificial fishing lure comprising a wire body formed in the shape of a V so as to have first and second arms joined at an apex, the first arm having at least one spinner blade attached near the distal end thereof, a hook connected to the distal end of the second arm, a weight formed about the second arm adjacent the hook, the second arm having a significantly greater diameter than the first arm, a line attaching portion formed in the wire body at the apex and having a diameter approximately equal to the diameter of the second arm, a filamentous skirt secured near the distal end of the second arm in such a manner as to conceal the hook, whereby the spinner blade is capable of generating vibration in the fishing lure without significant dampening of the vibration by the first arm, and the second arm provides greater strength for connecting the line attaching portion and the hook.

8 Claims, 1 Drawing Figure

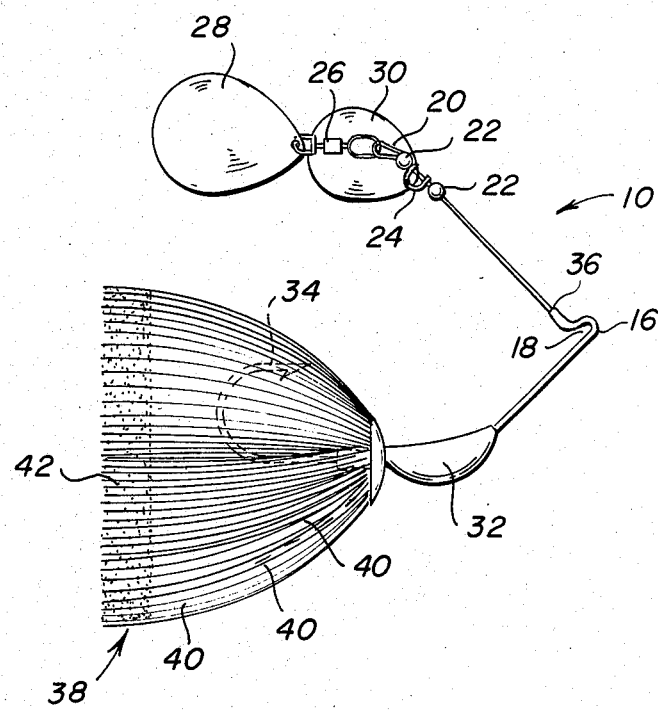

SPINNER BAIT WITH ARMS OF DIFFERENT DIAMETER

This invention relates to a fishing lure. More particularly, this invention relates to an improved fishing lure of the type known as a spinner bait.

BACKGROUND AND OBJECTS

For a number of years, sport fishing has enjoyed a tremendous popularity and has grown to the extent that it is now one of the largest participant sports in terms of the number of participants. Along with the growth in popularity has come a great interest in competitive fishing events, with still greater participation. As the sport of fishing has increased in popularity, the fishing tackle industry has experienced phenomenal growth, responding both to the needs of casual participants as well as professional competitive fishermen.

As a result, the fishing tackle industry has made tremendous advances in the equipment available to the modern angler in all areas, including the boating equipment, hand held equipment such as rods and reels, fishing lines, and terminal tackle such as the lures, hooks, baits, etc., all for the purpose of improving the catch of the angler.

In the area of terminal tackle, fishing lures have been the subject of much improvement with new finishes on the lures, new types of hooks, new lure designs, and the like. Still, one of the most popular and most versatile lures available has had little in the way of improvement. The lure known as a "spinnerbait" has remained relatively unchanged for some time. The lack of change in this lure is largely because of its proven fish catching ability in all types of water which might be encountered by the professional or amateur angler.

A "spinnerbait" is a lure which combines both a "spinner" and some other type of fish attractor, along with a weight and a hook into a weedless form. The lure has a generally V-shaped wire form, and at one end of the wire form is attached one or more blades or "spinners" which rotate about a swivel as the lure is drawn through the water.

At the other end of the wire form, a lead body or weight is molded, and a hook is attached adjacent the weight. The hook is turned upwardly toward the other end of the wire form, and the fishing line is secured to the wire at the apex of the V of the wire form. Some type of device is attached to the area of the hook shank to further attract fish, most commonly being a soft plastic worm or grub or piece of pork rind, or alternatively a plastic or rubber skirt which extends rearwardly to hide the hook and "ripple" through the water as the lure is retrieved. Such skirts are most popular and generally comprise a multiplicity of plastic or rubber filaments secured about the weight portion of the lure. Such skirts are often of a single color, but some such skirts are formed from mixed strands or filaments of different color, i.e. chartreuse strands, yellow strands, white strands, etc.

By this construction, the hook is protected from snagging onto underwater obstacles such as brush, grass, rocks or the like by the upper arm of the wire form, yet the action of the spinner(s) coupled with the action of the worm, grub, skirt or similar attractor entice the fish to strike at the bait.

The attraction of the fish to this type of lure is largely a function of the vibration and flash of the spinner blades. Also, the nature of the other fish attractor, or "trailer" which is attached to the hook bears a significant role in the ability of the lure to attract fish.

One drawback of such lures, however, has been the limitations encountered by the composite structure in the area of the wire form. On one hand, the wire must not be so stiff as to prevent the vibration of the lure caused by the spinner blades. But on the other hand, the wire must not be so flexible that it will be bent, and thereby rendered useless, when a fish is caught. These two antagonistic points have always resulted in a compromise in such baits, usually being a result of the choice of the manufacturer in order to satisfy both requirements within the realm of reasonableness.

Yet, in the area of sport fishing, and particularly in the area of competitive sport fishing, the compromise is often not adequate, and seemingly small differences can bring about significantly greater results.

Accordingly, a primary object of the present invention is to provide an improved artificial fishing lure of the spinnerbait type.

Another object of the invention is to provide an improved artificial fishing lure which enables a significantly improved vibration without sacrificing strength in the area of the hook.

A further object of this invention is to provide an artificial fishing lure having great strength in the portion of the lure where strength is required, but significant flexibility in the portion of the lure in which the vibration is generated.

These and other objects of the invention will become apparent when considered in light of the following description and claims when taken together with the accompanying drawing.

DESCRIPTION OF THE DRAWING

The figure in the drawing is a side elevation view of an artificial fishing lure according to this invention.

DESCRIPTION OF THE INVENTION

According to the present invention, a spinnerbait is provided based upon a wire form bent into a generally V-shape so as to have two arms extending from the apex of the "V" at an angle of about 30°–90°. Attached to one of the arms is one or more spinner blades, and attached to the other arm is a fishhook. Molded around the arm having the hook, and at the juncture of the hook and the arm, is a lead weight. At the apex of the V-shaped wire, a loop is provided for attaching the line in a known manner.

The wire form used for the lure is of a unitary construction, and the arm to which the blades are attached is of greatly reduced diameter in relation to the other arm, to which the hook is attached. Typically, the blade arm may have a diameter of about 50–75%, and preferably about 62–70%, of the diameter of the hook arm. In the preferred embodiment suitable for most fresh water fishing, the hook arm (i.e. the arm of the wire to which the hook is attached) would have a diameter of about 0.040 inch, while the spinner arm (the arm to which the spinner blade is attached) would have a diameter of about 0.020–0.030 inch, and preferably about 0.625–0.070 inch.

By this construction, the spinner blades attached to the spinner arm have a greatly increased ability to themselves spin, flash and vibrate, and to generate a greater degree of vibration within the entire bait as the vibrations are transmitted through the spinner arm to the remaining portions of the lure. But, due to the increased thickness of the wire arm beginning at approximately the point of attachment of the line and continuing down to the hook, strength is not sacrificed, and the greater strength in this portion of the lure will prevent the lure from being deformed during the hook set and during the playing of the fish.

The wire may be constructed in this configuration by several different techniques, such as drawing of a greater diameter wire through dies appropriately sized, by grinding a larger diameter wire, or even by welding or otherwise attaching a smaller diameter wire to a larger diameter wire. The manner in which the different size wire is produced is not particularly critical, so long as the strength of the wire is not lost during working. The wire should be a spring wire, with the resiliency obtained through known techniques, and if necessary, further treatment of the wire after sizing may be necessary in order to assure adequate retained strength and resilience.

The lower or hook arm of the lure has a weight molded around the wire, this weight being necessary to achieve proper balance as the lure is pulled through the water and to keep the lure from "rolling" or turning over in large circles as it passes through the water.

While conventional trailers may be attached to the hook, such as plastic worms, plastic or rubber skirts, pork rind strips, and the like, it has been found that a particular type of skirt will realistically emulate a natural bait fish and when coupled with the spinner blade(s), will appear as a small fish pursuing a smaller baitfish.

While various skirts have been used on spinner baits in the past, it has been found that these skirts do not as realistically simulate small fish, since the color appearance is essentially random. It has now been found that if the skirt is formed from a single color filament, and the tips of the filaments are dyed a different color, a more realistic appearance of simulation of a natural bait results. In this manner, the color is confined in a distinct longitudinal portion of the lure, just as in the case of a natural baitfish, rather than being "scattered" throughout the lure as appears when a skirt of different colored filaments is used.

By this construction, a lure with greatly enhanced fish catching ability is produced, a lure which realistically simulates a natural bait fish, and couples vibration, flash, and color in an optimum manner.

DESCRIPTION OF THE PREFERRED EMBODIMENTS

Referring now to the drawing, a spinner bait is shown and generally designated 10. This lure is seen to include a wire form comprising two arms 12 and 14 which are formed by bending a suitable piece of wire into the shape of a "V" so as to have an apex 16. The shape of the apex 16 is such that an eye 18 is provided to which a fishing line may be tied.

One end of the arm 12 is bent in the shape of a circle 20 after a pair of bearings 22 and clevis 24 are slipped onto the arm 12 and are free to rotate on the arm 12. The circle 20 provides a point of attachment for a snap-swivel 26 to which a spinner blade 28 is attached. In a preferred embodiment, a second spinner blade 30 is attached to the clevis 24. In this manner, the blade 28 rotates about the swivel 26, while the blade 30 and clevis 24 rotate about the arm 12 when the lure is pulled through the water.

The arm 14 extends downwardly from the apex 16 to a weight 32, typically formed of lead molded around the lower portion of the arm 14 or the upper portion of the hook 34.

As shown in the drawing, the arm 12 is significantly smaller in diameter than the arm 14, the diameter change being effected at a point 36 just above the apex 16. This diameter change can be produced by known wire deforming techniques, and can preferably be a smooth transtition, as a taper, or can be a more abrupt transition, again depending on the manner in which the change is produced.

The difference in diameter is on the order of 50-75%, and preferably about 62-70%. A diameter of about 0.025-0.028 inch for arm 12 and a diameter of about 0.040 inch for arm 14 have been found to produce excellent results. The smaller diameter wire arm 12 need only have sufficient strength as to be able to support the blade(s) 28 (30), whereas the arm 14 must be considerably stronger, since this arm 14 is a direct link between the line and the hook.

Attached to the weight 32 in a known manner is a skirt 38 formed from a multiplicity of plastic or rubber filaments. When initially attached to the body, the filaments 40 are all of the same color. However, the tips of the filaments 40 are then dyed as shown at 42. Typically, the tips of the filaments 40 would be dyed a contrasting color a length of about 0.25 to 0.50 inch from the ends of the filaments. But since the color is in this manner confined in a general area of the lure, the color will remain in a general area of the lure, especially when compared to a conventional type skirt in which different filaments are different colors, and in which the different colored filaments, being attached only at one end, are free to move in a random manner.

Although different sizes and shapes of blade(s) may be used on the lure, as is known, for a given size and shape of blade, a greater amount of fish attracting action is generated by means of the construction described. The blades 28 and 30, which are capable of generating a significant amount of vibration, are not dampened by a stiff wire 12, such as would be the case if the wire 12 had the same diameter as the wire 14. The vibration produced by the spinner blades is transmitted through the arm 12 to the remainder of the lure, and sufficient vibration is transmitted then through the wire 14 to the skirt, where a greatly enhanced rippling action is generated.

While this invention is described as having certain preferred features and embodiments, it will be understood that it is capable of still further variation and modification without departing from the spirit of the invention, and this application is intended to cover all variations and adaptations of the invention as fall within the spirit of the invention and the scope of the appended claims.

I claim:

1. An artificial fishing lure comprising a unitary wire body having different diameters at opposite ends thereof and formed in the shape of a V so as to have first and second arms integrally joined at an apex, said first arm having at least one spinner blade attached near the distal end thereof, a hook connected to the distal end of said second arm, a line attaching portion at the apex, the wire of said second arm having a significantly greater diameter than the wire of said first arm, said line attaching portion comprising a bent extension of said second arm and being of the same diameter as said second arm, said unitary wire body having a continuous and smooth taper from said line attaching portion to said first arm whereby said spinner blade is capable of generating vibration in said fishing lure without significant dampening of said vibration by said first arm.

2. An artificial fishing lure as in claim 1 and wherein said first arm has a diameter of about 50-75% of the diameter of said second arm.

3. An artificial fishing lure as in claim 1 and wherein the diameter of said first arm is about 62-70% of the diameter of said second arm.

4. An artificial fishing lure as in claim 1 and including a filamentous skirt secured near the distal end of said second arm.

5. An artificial fishing lure as in claim 4 and wherein the end portions of the filaments forming said skirt are of a different color than the remainder of the filaments of the skirt.

6. An artificial fishing lure as in claim 1 and including at least two of said spinner blades attached to the distal end of said first arm.

7. An artificial fishing lure as in claim 5 and including at least two of said spinner blades attached to the distal end of said first arm.

8. An artificial fishing lure comprising a unitary wire body having different diameters at opposite ends thereof and formed in the shape of a V so as to have first and second arms integrally joined at an apex, said first arm having at least one spinner blade attached near the distal end thereof, a hook connected to the distal end of said second arm, a line attaching portion at the apex, a weight formed about said second arm adjacent said hook, the wire of said second arm having a significantly greater diameter than the wire of said first arm, said line attaching portion comprising a bent extension of said second arm and being of the same diameter as said second arm, said unitary wire body having a continuous and smooth taper from said line attaching portion to said first arm, a filamentous skirt secured near the distal end of said second arm in such a manner as to conceal said hook, whereby said spinner blade is capable of generating vibration by said first arm and said second arm provides greater strength for connecting said line attaching poriton and said hook.

* * * * *